United States Patent [19]

Haskins

[11] Patent Number: 5,443,537
[45] Date of Patent: Aug. 22, 1995

[54] METHOD OF BALANCING AND ALIGNING WHEELS ON TRUCKS

[76] Inventor: Julian L. Haskins, P.O. Drawer 7729, Longview, Tex. 75607

[21] Appl. No.: 129,251

[22] Filed: Sep. 29, 1993

[51] Int. Cl.⁶ ............................................. G01B 5/255
[52] U.S. Cl. ..................... 33/193; 33/203.18; 73/457
[58] Field of Search ............... 33/203, 203.15, 203.16, 33/203.18, 203.19, 193; 73/457, 458, 466

[56] References Cited

U.S. PATENT DOCUMENTS

| | | | |
|---|---|---|---|
| 3,137,076 | 6/1964 | Hurst | 33/203 |
| 3,308,546 | 3/1967 | Storch | 33/203 |
| 3,327,537 | 6/1967 | Held | 73/457 |
| 3,483,911 | 12/1969 | Miller | 157/13 |
| 3,487,872 | 1/1970 | Kiedrowski | 157/13 |
| 3,595,295 | 7/1971 | Curry | 157/13 |
| 3,731,540 | 5/1973 | Emanuel et al. | 73/457 |
| 3,822,478 | 7/1974 | Aly et al. | 33/203 |
| 3,972,362 | 8/1976 | Pace | 157/13 |
| 3,987,338 | 10/1976 | Puetz | 73/466 |
| 4,159,574 | 7/1979 | Samuelsson et al. | 33/203.18 |
| 4,800,651 | 1/1989 | Hanlon | 33/203.15 |
| 4,803,785 | 2/1989 | Reilly | 33/203.18 |
| 5,048,954 | 9/1991 | Madey et al. | 356/155 |
| 5,058,424 | 10/1991 | O'Hara | 73/118.1 |

Primary Examiner—Thomas B. Will
Attorney, Agent, or Firm—John M. Harrison

[57] ABSTRACT

A method of balancing and aligning wheels on trucks which includes the steps of removing the bearing slack from the truck wheels by tightening the bearings; trimming or "trueing" the tires of the elevated drive tandem to the center of each axle as the center of the respective tire rotational circle; marking the axle hub to insure re-mounting of the tires in the same position on the axle hub; utilizing a strobe light and vibration sensor to detect weight imbalances in each set of trimmed wheels when the wheels are spun at high speed as the frame of the truck is jacked, and balancing each set of the trimmed wheels by adding weight to the areas on the wheel rim where balancing weight is needed; setting or adjusting the wheel and axle alignment using laser beam equipment and wheel alignment racks fitted with levels; and providing balanced brake drums in the wheels, if necessary.

17 Claims, 3 Drawing Sheets

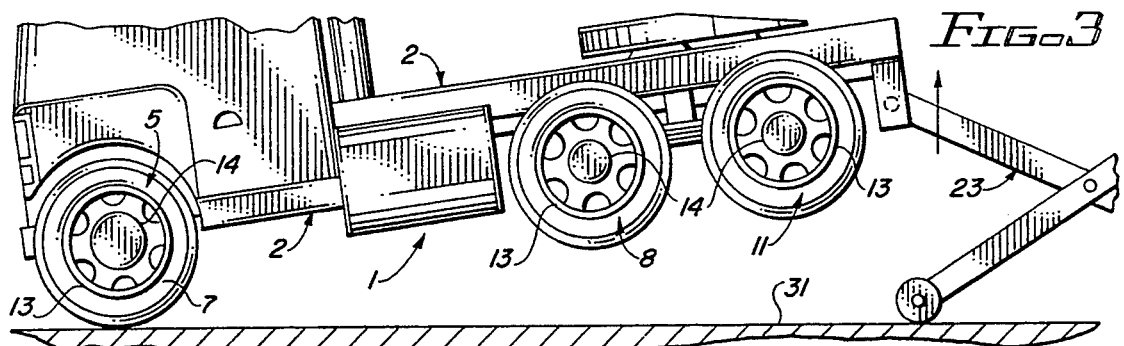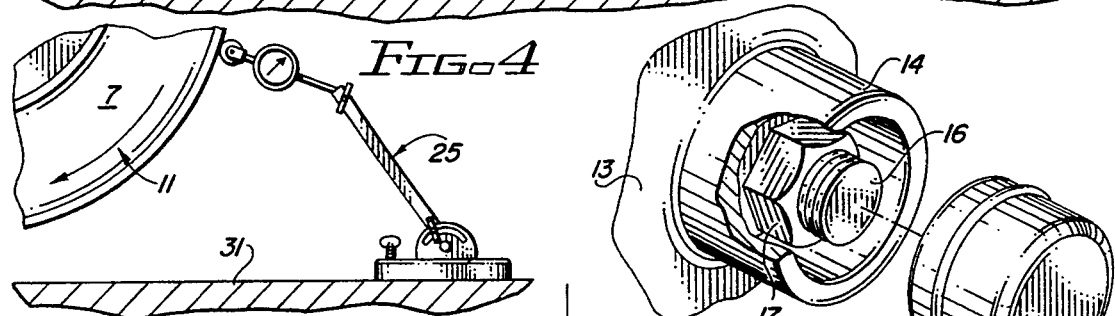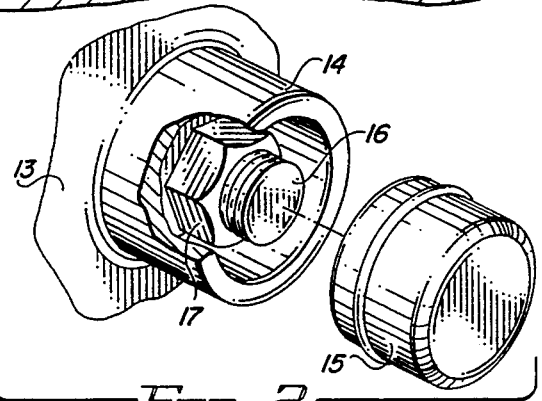

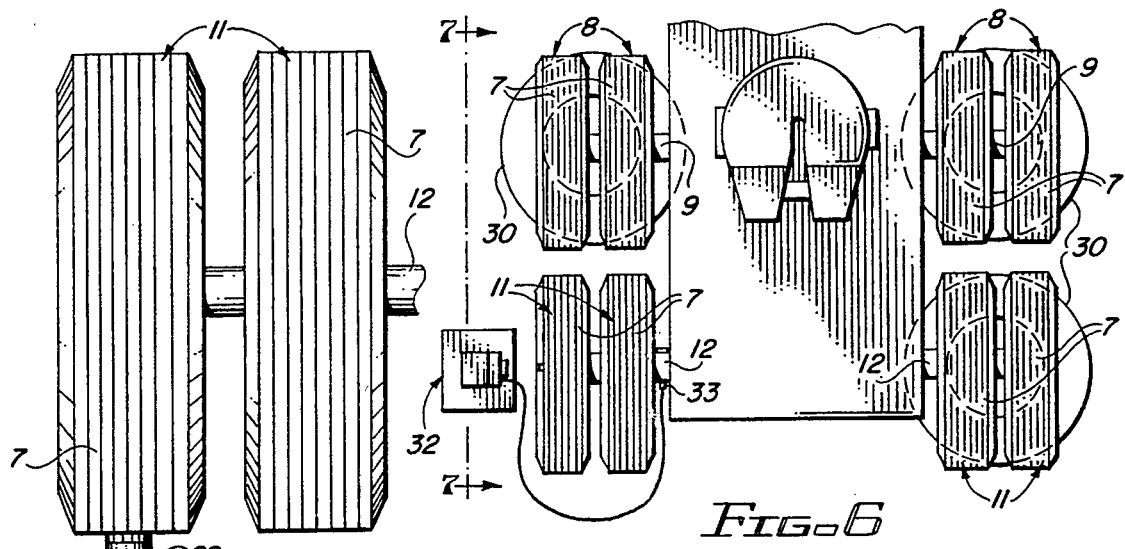
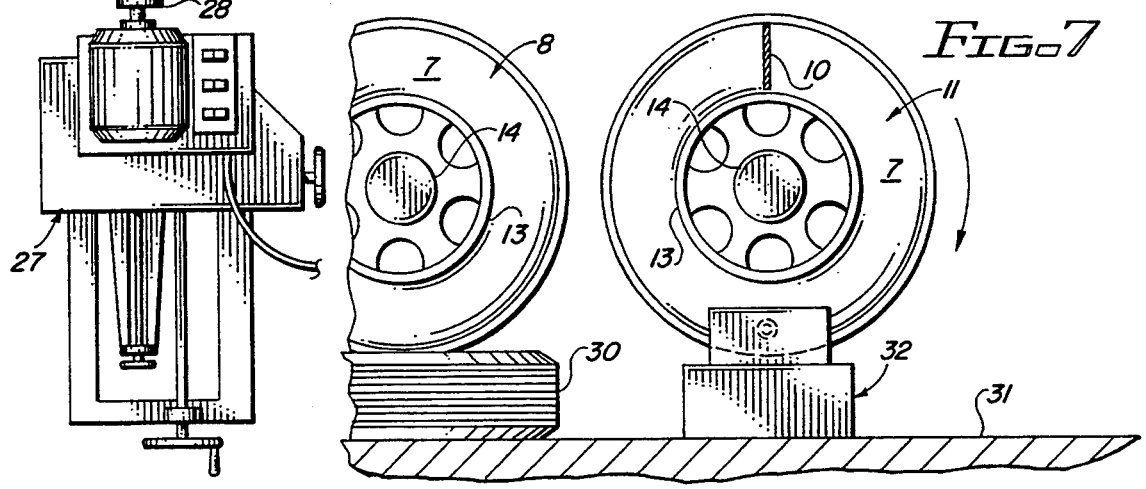
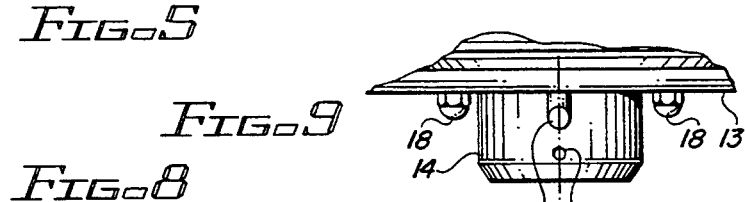
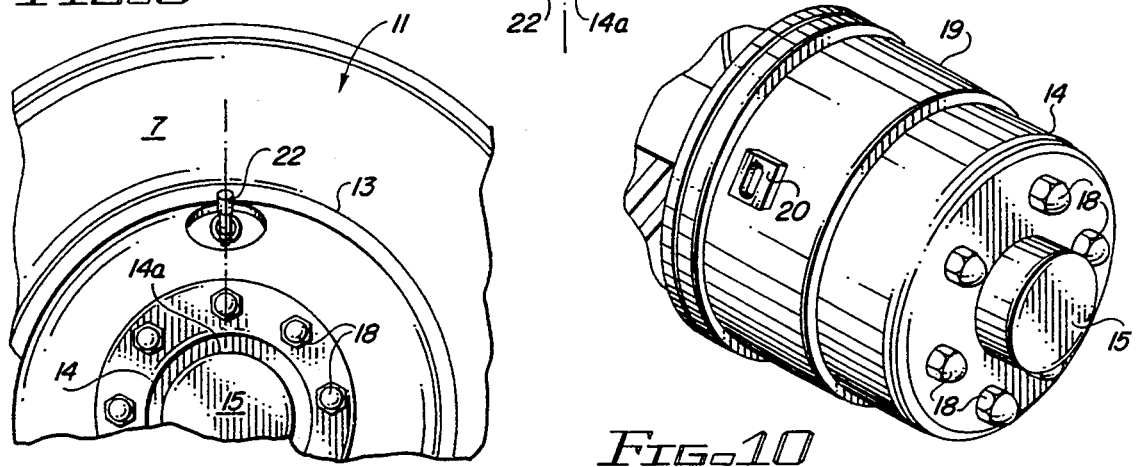

METHOD OF BALANCING AND ALIGNING WHEELS ON TRUCKS

BACKGROUND OF THE INVENTION

1. Field of the Invention

This invention relates to techniques for reducing road vibration in trucks such as the tractor in tractor-trailer rigs and more particularly, to a method of substantially eliminating road vibration in such trucks resulting primarily from wheel/tire runout and misalignment vibration, and for increasing the longevity of tractor tires, by the following steps: Removing the bearing slack from the truck wheels by tightening the bearings; trimming or "trueing" the tires of the drive tandem true to the axle center as the center of each tire rotational circle; utilizing a strobe light and vibration sensor to detect weight imbalances in each of the sets of trimmed wheels while the wheels are spun individually by operation of the vehicle engine when the frame is jacked; balancing the wheels by adding weight to appropriate areas of the wheel rim; setting or adjusting the wheel and axle alignment using laser beam equipment and mounting levels on the wheel alignment racks attached to the truck frame to facilitate aligning the three axles in a common plane; marking the axle hub for alignment with the valve stem on each tire to maintain the original tire mount configuration; and balancing the existing brake drums or providing balanced brake drums in the wheels.

One of the primary causes of road vibration in trucks such as tractor/trailer rigs, is wheel/tire runout, or the difference between the maximum and minimum radii of the wheels as measured from the center of wheel rotation. Whenever the geometric center of a wheel is offset from the axis of rotation, a variable radius or "runout" condition exists and this condition may cause extensive vibration as the truck or rig traverses the highway. For example, with the so-called "sensitive" trucks, even a mere 0.040 inches of runout may cause a drive tandem to bounce. A set of dual wheels that are eccentric by that amount may cause an axle oscillation cycle for each wheel revolution. The axle will then become a vibrating support for the suspension, which in turn, oscillates at a frequency determined by the wheel rotational speed. This condition is exacerbated by a tendency for newer trucks to ride on low-profile radial tires which have smaller air compartments and therefore offer considerably less vibration-cushioning capacity than high-profile tires. Accordingly, truck wheels and tires are capable of not only inducing a rough ride to the detriment of the driver, but also causing frame-bending and cab-pitching phenomena in many cases. Typically, the type of tire runout vibration which drivers consider to be most objectionable originates at the rearmost tandem axle wheel/tire positions. A random check of hundreds of randomly mounted tire/wheel assemblies determined that more than fifty percent were at least 0.040 inches out of round. This condition is sufficient to produce a cab pitch of about fifty percent in the "sensitive" vehicles.

This invention provides a method of substantially reducing and effectively substantially eliminating road vibration in trucks such as tractor/trailer rigs, in addition to substantially doubling tire life, by addressing the problems of wheel runout inherent in low profile radial tires with minimum air cushioning capacity, misalignment of wheels and other objectionable imbalanced tire conditions which develop in trucks in general and tractor/trailer rigs in particular, during the many hours of road operation.

2. Description of the Prior Art

Various techniques have been developed over the years to minimize the problem of wheel/tire runout and other conditions which contribute to road vibration, minimum tire life and accompanying distress to drivers of tractor/trailer rigs. An advanced concept such as "match-mounting" of wheels and tires is one approach which is receiving considerable attention. As the tire/wheel assembly is mounted on a truck, the out-of-roundness of the tire and wheel should cancel each other out and the amount of radial runout would be minimized, under circumstances where the high point of forced variation of the tire is aligned directly over the low point of the wheel. However, matched-mounting can only be effected on wheels that have a measurable degree of built-in non-uniformity. And in the vast majority of tire and wheel combinations, there is no such built-in non-uniformity, the non-uniformity being of a random nature. Other techniques include conventional spin balancing of and "trueing", or rounding the tires, as well as jacking and bending vehicle axles rather than jacking the frame of the vehicle, but these techniques only address part of the problem. Conventional aligning of the respective truck or tractor wheels is also effected to further minimize road vibration in trucks and tractor/trailer rigs.

U.S. Pat. No. 3,483,911, dated Dec. 16, 1969, to E. C. Miller, details a "Tire Trimming Device" which is used to remove projections from the surface of a tire. The device includes a pair of flexible, parallel, toothed interengaging rollers designed to grasp individual projections and remove them from the tire surface with substantially no disfigurement or distortion of the tire body. A guide device such as a roller and/or a presser foot which contacts the tire surface adjacent to the projection being removed may be used with the "Tire Trimming Device". U.S. Pat. No. 3,487,872, dated Jan. 6, 1970, to H. B. Kiedrowski, details a "Tire Trimmer" which rotatably supports a tire casing having unwanted rubber-like protrusions thereon and includes brushes for flexing the protrusions into an outstanding position and knives for cutting off the flexed protrusions as the tire casing rotates. A "Tire Tread Trimming and Trueing Apparatus" is detailed in U.S. Pat. No. 3,595,295, dated Jul. 27, 1971, to Kenneth D. Curry. The apparatus is designed to round the tread of tires to give the tread a perfect annular configuration, as well as a lateral arc. It includes a tire loading and unloading device, a tire rotating and tread-flexing device for both flexing the tire before trimming and rotating the tire during trimming and a guide apparatus for trimming the tire tread to the desired configuration. U.S. Pat. No. 3,972,362, dated Aug. 3, 1976, to Hubert J. Pace, details another tire trimming device. A knife is positioned against the direction of rotation of a tire and is skimmed over the left sidewall, the tread and the right sidewall of the rotating tire at least once to trim off the nibs. Paint is preferably sprayed on the tire sidewalls, the processed tire is ejected from the device by application of a brake apparatus and black paint may be applied to one sidewall as the white wall protector is applied to the other. U.S. Pat. No. 5,048,954, dated Sep. 17, 1991, to John Madey, et al, details a "Laser-Based Wheel Alignment System". The device includes a beam of collimated light emitted from a low-power, visible laser which is split into two generally parallel beams by a partially transmitting mirror and a series of plain front surface mirrors positioned in front and alongside the vehicle being serviced. The two beams are reflected from a set of plain mirrors attached to the rims of the wheels to be aligned. The vertical and horizontal angles of each of the wheel-mounted mirrors are set by calibrated lead-screws to cancel the angular displacement of the wheels expected when the wheels are properly aligned. The reflected beams are imaged through a large aperture beam combiner on a common viewing screen. Correct toe-in and camber settings are indicated when the laser beams reflected from the wheel-mounted mirrors overlap at the center of the viewing screen. The caster settings of the front wheels are measured by observing the angle at which the reflected spots travel across the screen when the steering wheel is turned. The system can be used to align the front wheels only, or alternatively, all four wheels simultaneously.

It is an object of this invention to provide a method of balancing and aligning truck wheels which includes the steps of elevating the rear end of the truck by lifting the truck frame; trimming or "trueing" the tires of the drive tandem to the center of each axle as the center of the respective tire rotational circle; utilizing a strobe light and vibration sensor to detect weight imbalances in each set of trimmed wheels, or "duals" when the wheels are spun in sets and balancing each of the trimmed wheels by adding weight to the areas of the wheel rim where balancing weight is needed; and setting or adjusting the wheel alignment using laser beam equipment, which includes wheel alignment racks attached to the front and rear frame and provided with levels to facilitate alignment of the wheels and the three axles in a common plane.

Another object of this invention is to provide a total alignment and vibration elimination technique for trucks, which includes the steps of tightening the bearings in each set of wheels to remove the bearing slack from the wheels; marking the axle hub for alignment with the valve stem on each tire to maintain the original tire mount configuration; determining the extent of elongation of the tires using a radial run-out gauge; coating the tire treads with paint and trueing the tires of the drive tandem to the center of each axle as the center of the respective tire rotation; strobe marking each set of tires and attaching a vibration sensor to the axle or frame of the truck and utilizing a strobe light to dynamically balance each set of tires, or "duals" while the frame of the truck is jacked, and balancing each of the trimmed wheels by adding weight to the areas on the wheel rim where balancing weight is needed; setting or adjusting the wheel and axle alignment using laser beam and equipment which includes levels mounted on the wheel alignment racks attached to the front and rear frame to facilitate alignment of the three axles in parallel, vertical planes; and providing balance brake drums on the wheels, if necessary.

SUMMARY OF THE INVENTION

These and other objects of the invention are provided in a new and improved method of balancing and aligning truck wheels, which includes the steps of tightening the bearings in each set of wheels, or "duals"; to remove the bearing slack from the wheels; determining the extent of elongation of the tires in the drive tandem using a radial run-out gauge; marking the tire treads with spray paint and trueing the tires of the drive tandem to the center of each axle as the center of the respective tire rotation; marking the axle hub for alignment with the valve stem on each tire to maintain the original tire mount configuration; strobe marking the outside one of each set of tires and attaching a vibration sensor to the axle of the truck and utilizing a strobe light to dynamically balance each set of duals while the frame of the truck is jacked and balancing each of the trimmed duals, including the brake drums, by adding weight to the areas on the wheel hub where additional weight is needed; setting or adjusting the wheel alignment using laser beam and spanning bar equipment and levels attached to the wheel alignment racks suspended from the front and rear frame to facilitate alignment of the three axles in parallel, vertical planes; and balancing the entire dual wheel assembly, including unbalanced brake drums on the wheels.

BRIEF DESCRIPTION OF THE DRAWINGS

The invention will be better understood by reference to the accompanying drawings, wherein:

FIG. 1 is a block diagram indicating various steps in the method of balancing and aligning truck wheels of this invention;

FIG. 2 is a perspective view, partially in section, of an axle hub, a threaded axle and an axle retaining nut threaded on the axle for implementing step 1 illustrated in FIG. 1;

FIG. 3 is a side view, partially in section, of a truck having the rear end lifted by operation of a scissor jack applied to the frame of the truck for implementing Step 2 of the invention illustrated in FIG. 1;

FIG. 4 is a side view of a portion of a truck tire engaged by a radial run-out gauge for determining the eccentricity of the tire for implementing Step 3 illustrated in FIG. 1;

FIG. 5 is a top view of a set of "duals" or pair of rear wheels mounted on a common axle, the tire of one of which wheels is engaged by the cutting head of a tire trimming machine for trimming or "trueing" the tire of the drive tandem to the center of each axle as the center of the respective tire rotational circle to implement the fourth step illustrated in FIG. 1;

FIG. 6 is a top view of the rear portion of the truck illustrating four sets of "duals" or sets of tires on the middle and rear axles, respectively, which make up the drive tandem, with the tire balancing machine in close proximity to one set of "duals" and a vibration sensor attached to the tire balancing machine and mounted on the frame of the truck for dynamically balancing each set of duals individually in order to implement Step 5 illustrated in FIG. 1;

FIG. 7 is a side view of the tire balancing machine and rear set of duals illustrated in FIG. 6, more particularly illustrating a preferred technique for using a strobe light in the tire balancing machine to effect the desired dynamic balancing of each set of duals to further implement, Step 5 illustrated in FIGURE FIG. 8 is a side view, partially in section, of a tire mounted on a rim, further illustrating a mark placed on the wheel hub in alignment with the tire valve stem for maintaining consistent mounting of the tire on the rim in the dynamically balanced configuration;

FIG. 9 is a top view, partially in section, of tire hub and wheel rim, more particularly illustrating alignment of the valve stem and mark on the axle hub illustrated in FIG. 8;

FIG. 10 is a perspective view of an axle hub attached to a brake drum, with the wheel rim and tire removed, more particularly illustrating a brake drum weight placed on the brake drum to balance the brake drum;

DESCRIPTION OF THE PREFERRED EMBODIMENTS

Figure 11:
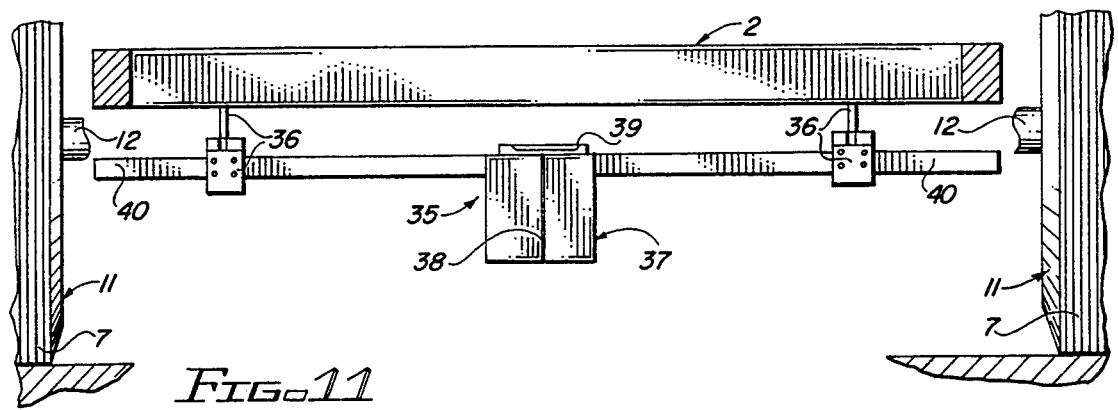
FIG. 11 is a rear view, partially in section, of the truck, more particularly illustrating the truck frame and a wheel alignment rack attached to the frame for aligning the three axles carried by the truck frame and implementing Steps 7-9, illustrated in FIG. 1.

Referring initially to FIGS. 1-3 of the drawings, one of the first steps in implementing the method of balancing and aligning wheels on trucks of this invention is effected by removing the grease cover 15 from the axle hub 14 of each of the center wheels 8 and rear wheels 11 on the truck 1 illustrated in FIG. 4 and tightening the retaining nut 17 to, in turn, tighten the wheel bearings (not illustrated) seated on the axle 16 in the axle hub 14. This step serves to minimize wobbling of each of the dual center wheels 8 and rear wheels 11 mounted on the center axle 9 and rear axle 12, respectively, in the truck 1.

Referring again to FIG. 4 and to FIG. 5 of the drawings, a second step of the method of this invention includes placing the lifting element of a scissor jack 23 beneath the rear end of the truck frame 2 of the truck 1 and raising the rear end of the truck 1 as illustrated, to elevate the dual center wheels 8 and the rear wheels 11 from the front wheel 5. As illustrated in FIG. 4, a radial run-out gauge 25 is then maneuvered into position in sequential contact with the tires 7 on the center wheels 8 and rear wheels 11 of the truck 1 and the center wheels 8 and rear wheels 11 are rotated in pairs, or duals, by operating the engine and engaging the respective gears (not illustrated) of the truck 1 to determine the eccentricity of the respective tires 7. After the degree of eccentricity is determined for each of the tires 7 in the center wheels 8 and the rear wheels 11, each tire is individually trimmed or "trued" using the tire trimming machine 27 illustrated in FIG. 5. The tread of each tire 7 is coated with white paint, typically by spraying, and tire trimming machine 27 is positioned in close proximity sequentially to each of the tires 7, with the cutting head 28 touching the tires 7. As the tires 7 rotate by operation of the engine in the truck 1, the cutting head 28 trims the eccentricity from each tire to create a dual tire assembly that rotates in a true circle on the axle upon which it is mounted. The resulting black trimmed areas can be easily identified by contrast, since the tires 7 have been previously coated with the white spray paint. The tires 7 are thusly trued to the rotational centerline of the respective center wheels 8 and rear wheels 11 at the axle hubs 14, respectively.

Referring now to FIGS. 6 and 7 of the drawings, respective sets of "dual" center wheels 8 and rear wheels 11 are dynamically balanced in sequence while mounted on the corresponding center axle 9 and rear axle 12, as illustrated in FIG. 6. This procedure is accomplished by placing demounted supporting tires 30 beneath three of the four sets of tires 7 and operating the scissor jack 23 to lower the rear end of the truck 1 until three of the four sets of tires 7 in the center wheels 8 and rear wheels 11 are resting on the supporting tires 30, while the remaining single set of rear wheels 11 is suspended above the supporting surface 31 as illustrated in FIG. 7. A white strobe tire mark 10 is then applied to the outside tire 7 of the elevated dual rear wheels 11 and the tire balancing machine 32 is placed in close proximity to the rear wheels 11, as illustrated. A vibration sensor 33 element of the tire balancing machine 33 is then attached to the rear axle 12 of the truck 1 and the tire balancing machine 32 is operated to generate a strobe light as the elevated set of rear wheels 11 is driven by the truck engine and transmission at a speedometer reading of about 25 miles per hour, which is equivalent to a tire speed of approximately 55-63 miles per hour, depending upon the circumference of the tires. The strobe light (not illustrated) in the tire balancing machine 32 synchronizes with the rotating strobe tire mark 10 located on the outside tire 7 of the rotating rear wheels 11 and coordinates electronically with the vibration sensor 33 to measure the point or points on the tires 7 and the rear wheels 11 which require the addition of wheel weights in order to dynamically balance the rear wheels 11. Suitable weights (not illustrated) are then attached to the respective wheel rims 13 in conventional manner. It will be appreciated that in the course of balancing the wheels 11, the brake drums 19 (illustrated in FIGURE 10) are also balanced, thereby effecting a complete balancing of both dual sets of tires 7 in the rear wheels 11. The remaining set of rear wheels 11, as well as the two sets of center wheels 8 are dynamically balanced in sequence in the manner described above by utilizing the supporting tires 30 and the scissor jack 23, until all four sets of dual center wheels 8 and rear wheels 11 are balanced by application of weights to the wheel rims 13. Alternatively, the brake drums 19 may be individually balanced by adding or removing brake drum weights 20 as illustrated in FIG. 10, after first marking the axle hub 14 with a hub mark 14a as illustrated in FIGS. 8 and 9, to facilitate alignment of the hub mark 14a with the corresponding valve stem 22 on each of the tires 7 and insure that the tires 7 are replaced on the corresponding wheel rims 13 in the same relative position as they were removed, since they were dynamically balanced in this original configuration. After removal of the respective lug nuts 18, wheel rims 13 and tires 7 from the corresponding axle hubs 14, the brake drums 19 are exposed for adjustment of the brake drum weights 20, as desired.

Figure 12:
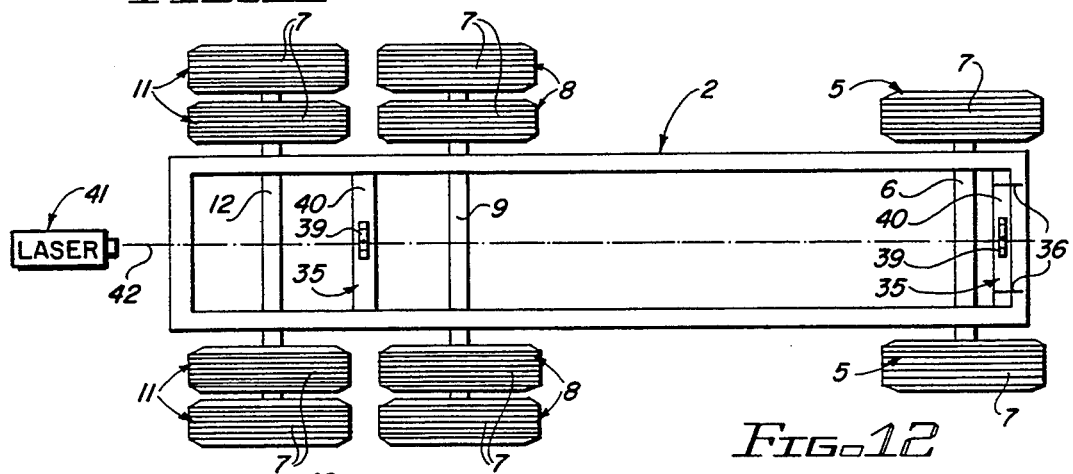
FIG. 12 is a top view of the truck frame with the cab and body removed, more particularly illustrating the use of a laser gun and laser beam to effect alignment of the three axles to implement Steps 7, 8 and 9 in FIG. 1.
Figure 13:
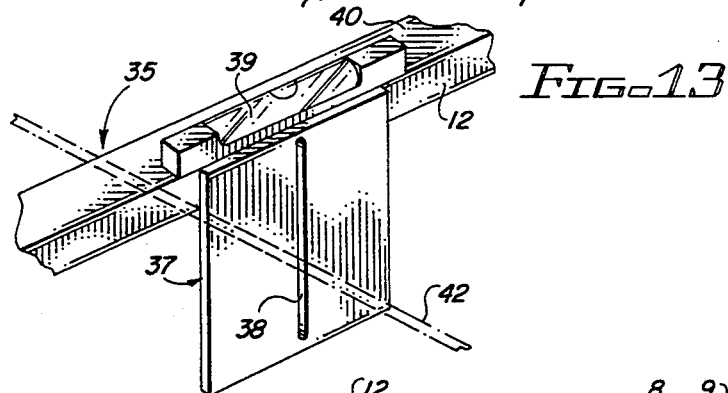
FIG. 13 is a perspective view of a portion of the wheel alignment rack illustrated in FIGS. 11 and 12, further illustrating implementation of the laser gun and laser beam.

Referring now to FIGS. 11-13 of the drawings, Steps 7, 8 and 9 of the method of this invention illustrated in FIG. 1 are effected by mounting a pair of wheel alignment racks 35 on the front portion of the truck frame 2 and on the rear portion of the truck frame 2 between center axle 9 and the rear axle 12, as illustrated in FIGS. 11 and 12. Each of the wheel alignment racks 35 includes a support beam 40, upon which a pair of mount brackets 36 are attached, with target plates 37 projecting downwardly from the support beam 40. Each of the target plates 37 is fitted with a vertical plate slot 38 and a level 39 is mounted on the support beam 40 immediately above each target plate 37, as illustrated in FIG.

11. A laser gun 41 is positioned at the rear of the truck 1 and is oriented to project a laser beam 42 beneath the truck frame 2 and longitudinally along the length of the truck frame 2, through the plate slots 38 in each of the target plates 7. The laser gun 41 is oriented to project the laser beam 42 first through the plate slot 38 in the rear target plate 37, positioned on the wheel alignment rack 35 mounted between the center axle 9 and the rear axle 12 on the truck frame 2. The mount brackets 36 are designed to engage the truck frame 2 as illustrated in FIG. 12, to removably support the wheel alignment racks 35 in position, as illustrated. Depending upon the location of impingement of the laser beam 42 on the front one of the target plates 37, adjustments are made in the front axle 6, center axle 9 and/or the rear axle 12 as necessary, in order to insure that the front axle 6, center axle 9 and rear axle 12 are all aligned substantially in parallel, vertical planes. This alignment further insures that the front wheels 5, center wheels 8 and rear wheels 11 are substantially vertically aligned, such that the tires 7 in each set of "duals" in the front wheels 5, center wheels 8 and rear wheels 11 are resting on the supporting surface 31 and proportionally distribute the weight of the truck 1. The toe-in, caster, camber and other wheel adjustments are then effected in conventional fashion.

Figure 14:
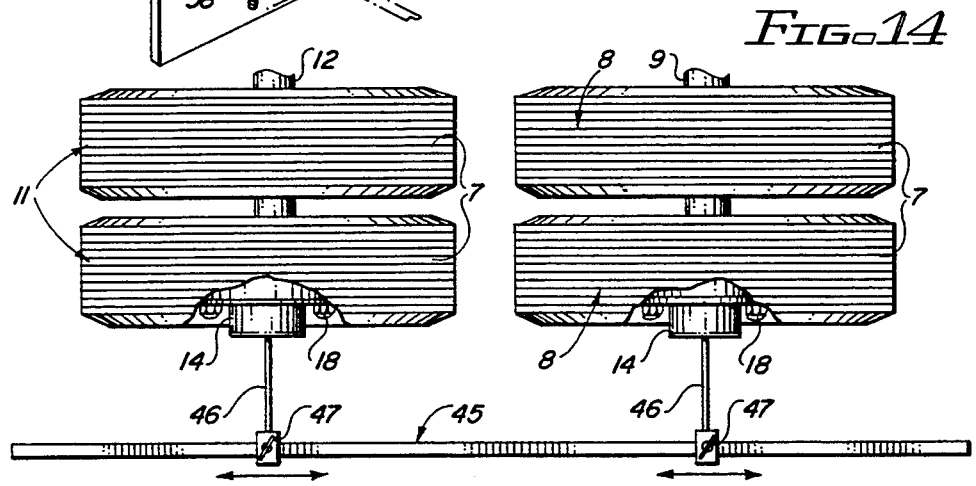
FIG. 14 is a top view of respective duals mounted on adjacent axles, more particularly illustrating a spanning bar for measuring the distance between the axles.

Referring now to FIG. 14 of the drawings, another step in the method of balancing and aligning wheels on trucks of this invention is effected by using a spanning bar 45, fitted with adjustable hub markers 46, having thumb screws 47, to determine the distance between the respective axle hubs 14 of the center axle 9 and rear axle 12 and insure that the center axle 9 and rear axle 12 are parallel to each other and are mounted substantially perpendicular to the truck frame 2.

It will be appreciated by those skilled in the art that the method of balancing and aligning wheels on trucks of this invention is characterized by a total wheel alignment and balancing technique that enables highly accurate elimination of vibration, "pull" and tire wear over many miles of travel. For example, it has been found that application of the method of this invention has resulted in doubling tire life. Substantial improvement in truck ride is effected by applying the basic steps of trimming and balancing the "duals" in the drive tandem by jacking the truck frame and dynamically balancing each set of "duals" using a strobe light and using the laser equipment to effect proper wheel and axle alignment. Refinement may be added by also balancing the brake drums or providing balanced brake drums in extreme cases of brake drum imbalance, marking the axle hubs for consistent remounting of the tires in the dynamically balanced configuration and tightening the truck wheel bearings to remove bearing slack. Use of the radial run-out gauge also helps to refine the tire trimming procedure. Lifting the frame of the truck rather than jacking the individual axles also greatly improves the efficiency of the method of this invention.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A method of balancing and aligning the wheels on trucks having a truck frame, said wheels fitted with tires and having wheel bearings, brake drums and wheel hubs and mounted on axles carried by the truck frame, comprising the steps of raising the rear end of the truck frame and said tires from a supporting surface; trimming the tires of said wheels substantially true to the center of wheel rotation; placing supports under selected ones of said wheels and said tires and dynamically balancing the remaining ones of said wheels and said tires while said remaining ones of said wheels and said tires are spun by operation of the truck when the truck frame is jacked and adding balancing weight to said remaining ones of said wheels; removing said supports, lowering the rear end of the truck frame to position said tires on the supporting surface; and levelling said axles in substantially parallel, vertical planes.

2. The method of claim 1 including the step of tightening the wheel bearings in said wheels prior to raising the rear end of the truck.

3. The method of claim 1 including the step of balancing said brake drums in said wheels after levelling said axles.

4. The method of claim 1 including the steps of:
 (a) tightening the wheel bearings in said wheels prior to raising the rear end of the truck; and
 (b) balancing said brake drums in said wheels after levelling said axles.

5. The method of claim 1 including the step of marking said wheel hubs and said wheels, dismounting said wheels from said axles, adding weights to said brake drums and remounting said wheels in a selected position on said wheel hubs after levelling said axles.

6. The method according to claim 5 including the step of tightening the wheel bearings in said wheels prior to raising the rear end of the truck.

7. The method according to claim 1 including the step of determining the eccentricity of said tires before trimming the tires of said wheels.

8. The method according to claim 7 including the step of tightening the wheel bearings in said wheels prior to raising the rear end of the truck.

9. The method according to claim 7 including the step of balancing said brake drums in said wheels after levelling said axles.

10. The method according to claim 7 including the step of marking said wheel hubs and said wheels, dismounting said wheels from said axles, adding weights to said brake drums and remounting said wheels in a selected position on said wheel hubs after levelling said axles.

11. The method according to claim 7 including the steps of:
 (a) tightening the wheel bearings in said wheels prior to raising the rear end of the truck; and
 (b) balancing said brake drums in said wheels after levelling said axles.

12. A method of balancing and aligning four sets of wheels fitted with tires resting on a supporting surface, said wheels having axle hubs, wheel bearings and brake drums and mounted on axles carried by the frame of a truck, comprising the steps of:
 (a) jacking the rear end of the frame of the truck to clear said tires from the supporting surface;
 (b) trimming the circumference of said tires on said wheels substantially true to the center of rotation of said wheels on said hub;
 (c) sequentially immobilizing a selected three sets of said wheels and said tires and leaving a selected one set of said wheels and said tires free to rotate and sequentially allowing each of said selected one set of said wheels and said tires to rotate in sequence by operation o the truck and dynamically balancing said selected one set of said wheels and said tires and said brake drums together; and (d) determining the planer orientation of said axles, adjusting said axles into substantially vertical, parallel planes and aligning said wheels.

13. The method according to claim 12 including the step of tightening the wheel bearings in said wheels prior to jacking the rear end of the truck.

14. The method according to claim 12, including the step of marking said wheel hubs and said wheels, dismounting said wheels from said axles, adding weight to said brake drums and remounting said wheels in a selected position on said wheel hubs after levelling said axles.

15. The method according to claim 12 including the steps of:

(a) tightening the wheel bearings in said wheels prior to jacking the rear end of the truck; and (b) marking said wheel hubs and said wheels, dismounting said wheels from said axles, adding weights to said brake drums and remounting said wheels in a selected position on said wheel hubs after levelling said axles.

16. A method of balancing and aligning dual sets of wheels fitted with tires resting on a supporting surface, said wheels having axle hubs, wheel bearings and brake drums and mounted on a pair of axles carried by the frame of a truck, comprising the steps of:

(a) tightening the wheel bearings in said wheels;

(b) jacking the rear end of the frame of the truck to sequentially clear each of said tires of said dual sets of said wheels from the supporting surface while the remaining tires of said wheels remain on the supporting surface;

(c) trimming the circumference of said each of said tires on said wheels substantially true to the center of rotation of said wheels on said axle hubs;

(d) sequentially immobilizing a selected three sets of said wheels and said tires and leaving a selected one set of said wheels free to rotate and sequentially allowing each of said selected one set of said wheels and said tires to rotate by operation of the truck, dynamically balancing said selected one set of said wheels and said tires and said brake drums and applying balancing weights to said selected one set of said wheels; and (e) marking said axle hubs and said wheels, dismounting said wheels from said axles, adding weights to said brake drums and remounting said wheels in a selected position on said axle hubs after levelling said axles.

17. The method according to claim 16 comprising measuring the distance between said axles and adjusting said axles for substantially parallel disposition with respect to each other.

* * * * *